J. P. McINTYRE.
HARROW.
APPLICATION FILED JULY 22, 1916.
1,231,398.
Patented June 26, 1917.
2 SHEETS—SHEET 1.
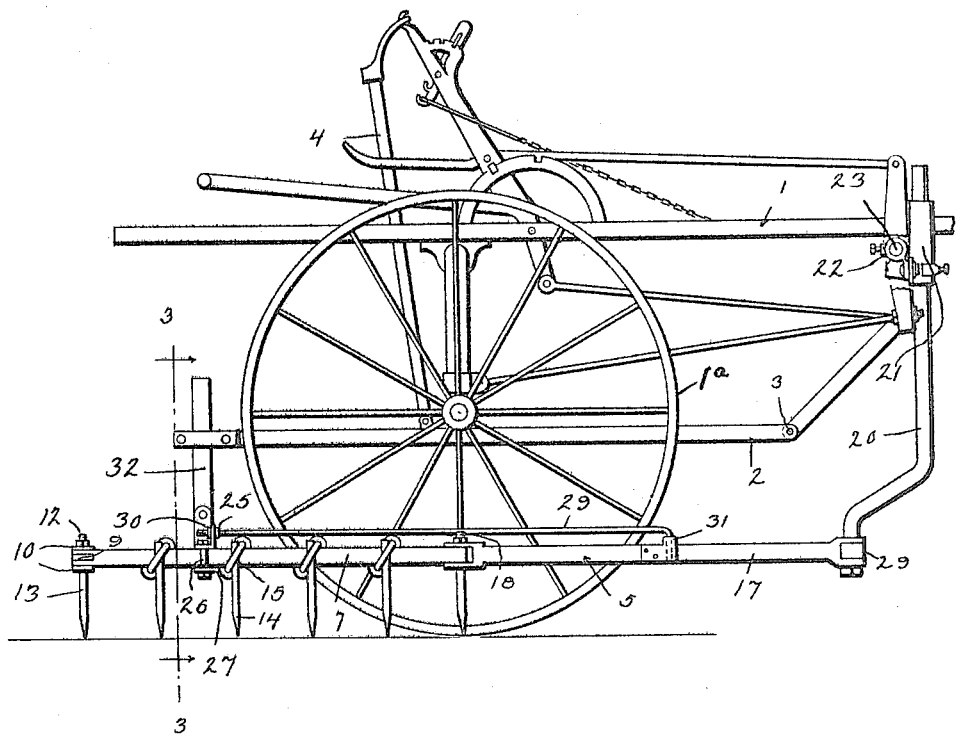
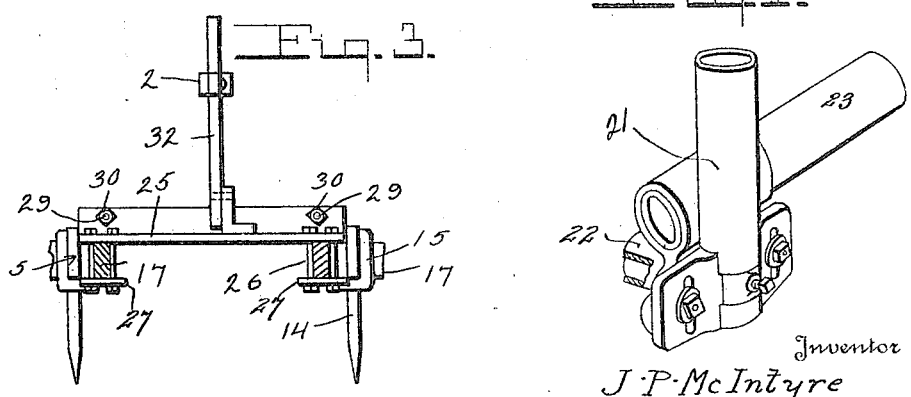
Inventor
J. P. McIntyre

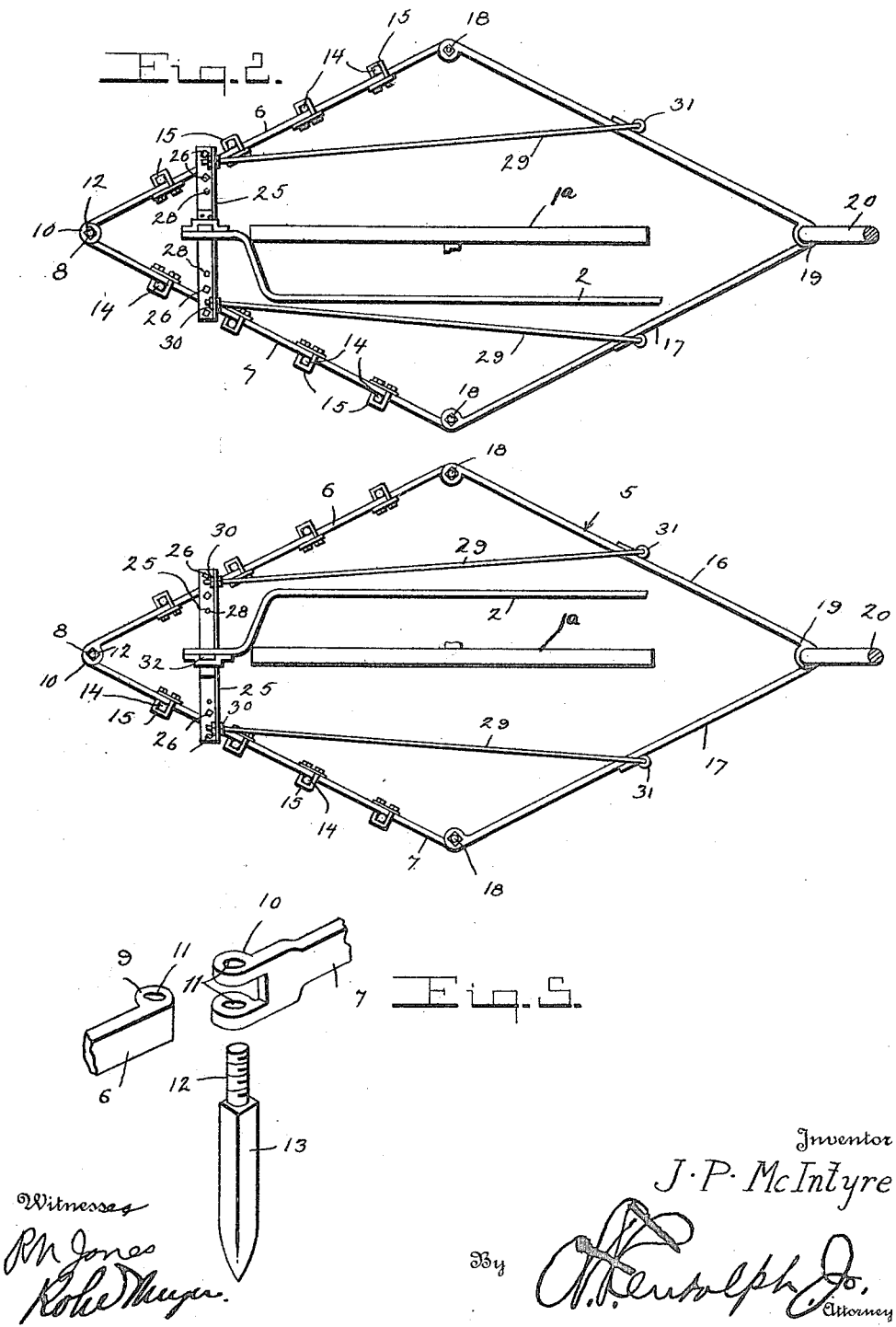

UNITED STATES PATENT OFFICE.

JOHN P. McINTYRE, OF SAGERTON, TEXAS.

HARROW.

1,231,398. Specification of Letters Patent. Patented June 26, 1917.

Application filed July 22, 1916. Serial No. 110,731.

*To all whom it may concern:*

Be it known that I, JOHN P. MCINTYRE, a citizen of the United States, residing at Sagerton, in the county of Haskell and State of Texas, have invented certain new and useful Improvements in Harrows; and I do hereby declare the following to be a full, clear, and exact description of the invention, such as will enable others skilled in the art to which it appertains to make and use the same.

This invention relates to harrows, and the primary object of the invention is to provide a harrow structure which may be attached to an ordinary cultivator in lieu of the cultivating shovels usually carried thereby, for the cultivation of growing grain, such as corn or the like.

Another object of this invention is to provide a harrow structure as specified which is composed of a pair of hingedly connected bars, having reaches pivotally connected to their forward ends, which reaches are connected through the medium of rods to a rod extending transversely across the forward end of the supporting structure of a cultivator.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Figure 1 is a side elevation of the improved harrow illustrating the same applied to an ordinary cultivator.

Fig. 2 is a top plan view of a pair of harrow structures as attached to a cultivator.

Fig. 3 is a vertical section on the line 3—3 of Fig. 1.

Fig. 4 is a detail view illustrating the manner of connecting the rod which is connected to the forward ends of the harrow structures to the cross bar carried by the cultivator frame, and Fig. 5 is a detail perspective view illustrating the connected pivoted ends of the harrow tooth carrying bars which are pivotally connected by means of the harrow tooth.

Referring more particularly to the drawings, 1 designates an ordinary wheeled cultivator of any desired type commonly in use which includes supporting wheels 1ª and standards 2 to which cultivating shovels are ordinarily connected. The standards 2 are pivotally connected as shown at 3 for movement into and out of an operative position through the medium of a lever 4, as ordinary in cultivator construction. The harrow structures which are generically indicated by the numeral 5 each include a pair of bars 6 and 7 which converge and have their rear ends pivotally connected as shown at 8. The bar 6 is provided with a rolled end 9 which is adapted for seating between the spaced ears 10 which are formed upon the rear end of the bar 7. The ears 10 and the rolled end 9 are provided with alining openings 11 through which the shank 12 of a harrow tooth 13 extends for pivotally connecting the two bars 6 and 7 of the harrow structure. The bars 6 and 7 have harrow teeth 14 attached thereto at spaced intervals by the ordinary type of U-shaped clamping bolts 15 commonly employed for attaching harrow teeth to the supporting bar.

Reaches 16 and 17 are pivotally connected as shown at 18 to the forward ends of the bars 6 and 7 and they have their forward ends converging as shown at 19 in Fig. 2 of the drawings. The connected ends 19 of the reach bars 16 and 17 are connected and have the lower end of a rod 20 detachably connected thereto. The rod 20 extends forwardly and upwardly from the forward converging ends of the reach bars 16 and 17, and removably extends through a vertical opening in a coupling member 21. The coupling member 21 is connected to a second coupling 22 which is mounted upon a rod or pipe 23. The rod or pipe 23 is attached to the frame 1 of the cultivator and extends transversely across the forward end of the same. The section 21 of the coupling member is loosely connected to the coupling 22 so as to permit of a limited oscillatory movement of the rod 20 for accommodation to the movement of the harrow structure. A supporting or brace angled iron 25 is attached to the upper surfaces of the harrow bars 6 and 7. The angled brace 25 is attached to the bars 6 and 7 a short distance forwardly of the rear ends by means of bolts 26 which extend through clamping plates 27. The bar 25 is provided with a plurality of spaced openings 28 for receiving the bolts 26 so as to permit of the adjustment of the bars 6 and 7 with respect to each other. Brace rods 29 are adjustably connected as shown at 30 to the vertical portion of the angled brace bar 25 and they have their forward ends connected as shown at 31 to the reach bars 16 and 17.

A vertical standard 32 is connected to the angled brace 25 and is adapted for detachable connection with the standards 2 of the cultivator for connecting the rear end of the harrow structure to the standards of the cultivator so that the harrow may be moved into or out of operative position upon movement of the standards 2 by the lever 4.

In reducing the invention to practice, certain minor features of construction, combination and arrangement of parts may necessitate alterations to which the patentee is entitled provided such alterations are comprehended within the scope of what is claimed.

What is claimed is:—

1. The combination with an ordinary cultivator including a supporting structure, supporting wheels, a pivotally mounted standard and a lever for moving said standard into and out of operative position, of a harrow structure including a pair of harrow tooth carrying bars having their rear ends pivotally connected, a bracing bar adjustably connected to said harrow tooth carrying bars, a standard connected to said bracing bar and detachably connected to the cultivator standard for connecting the harrow to the cultivator standard, said harrow tooth carrying bars having their rear ends converging and being positioned one upon each side of one wheel of the cultivator.

2. The combination with an ordinary cultivator including a supporting structure, supporting wheels, a pivotally mounted standard and a lever for moving said standard into or out of operative position, of a harrow structure, said harrow structure including a pair of harrow tooth carrying bars, the rear ends of said harrow tooth carrying bars converging and being pivotally connected, harrow teeth carried by said bars, reach bars pivotally connected to the front ends of said harrow tooth carrying bars, and a rod connected to the forward ends of said reach bars and to the supporting frame of said cultivator and a standard connected to the rear ends of said harrow tooth carrying bars and to said cultivator standard.

3. The combination with an ordinary cultivator including a standard and a supporting frame, of a harrow structure including a pair of harrow tooth carrying bars, the rear ends of said harrow tooth carrying bars being converging, a harrow tooth extending through the converging ends of said bars for pivotally connecting them, a pair of reach bars pivotally connected to the forward ends of said harrow tooth carrying bars and forming with the bars a diamond shaped frame, a rod connected to the forward end of said frame and to the supporting structure of the cultivator for permitting of a limited lateral movement of the forward end of the frame, and a standard connected to said harrow tooth carrying bars and the cultivator standard.

In testimony whereof I affix my signature in presence of two witnesses.

JOHN P. McINTYRE.

Witnesses:
L. H. SCHROEDER,
J. F. RODGERS.

Copies of this patent may be obtained for five cents each, by addressing the "Commissioner of Patents, Washington, D. C."